(12) United States Patent
Rosenmaier et al.

(10) Patent No.: US 9,004,219 B2
(45) Date of Patent: Apr. 14, 2015

(54) DRIVE CONTROL SYSTEM

(75) Inventors: Peter Rosenmaier, Cassina Rizzardi (IT); Jan Klindworth, Cernobbio (IT)

(73) Assignee: Palmarix Ltd., Watergardens (GI)

( * ) Notice: Subject to any disclaimer, the term of this patent is extended or adjusted under 35 U.S.C. 154(b) by 339 days.

(21) Appl. No.: 13/138,274

(22) PCT Filed: Jul. 27, 2010

(86) PCT No.: PCT/IT2010/000022
§ 371 (c)(1),
(2), (4) Date: Jan. 27, 2012

(87) PCT Pub. No.: WO2010/086890
PCT Pub. Date: Aug. 5, 2010

(65) Prior Publication Data
US 2012/0125141 A1  May 24, 2012

(30) Foreign Application Priority Data

Jan. 27, 2009 (IT) .............................. RM2009A0032

(51) Int. Cl.
| | |
|---|---|
| *B62D 5/06* | (2006.01) |
| *B62D 5/00* | (2006.01) |
| *B63H 25/02* | (2006.01) |
| *B63H 25/18* | (2006.01) |
| *G09B 9/02* | (2006.01) |
| *B63H 25/22* | (2006.01) |
| *B63H 25/24* | (2006.01) |

(52) U.S. Cl.
CPC ................ *B62D 5/006* (2013.01); *B63H 25/02* (2013.01); *B63H 25/18* (2013.01); *B63H 25/22* (2013.01); *B63H 25/24* (2013.01); *G09B 9/02* (2013.01)

(58) Field of Classification Search
CPC .......... B62D 5/001; B62D 5/006; B62D 5/09; B62D 5/091
USPC .................................................. 180/402, 403
See application file for complete search history.

(56) References Cited

U.S. PATENT DOCUMENTS

| | | | | |
|---|---|---|---|---|
| 3,657,888 | A | * | 4/1972 | Zirps .............................. 60/385 |
| 5,862,878 | A | * | 1/1999 | Bohner et al. ................ 180/403 |
| 6,269,903 | B1 | * | 8/2001 | Bohner et al. ................ 180/406 |

(Continued)

FOREIGN PATENT DOCUMENTS

| | | |
|---|---|---|
| DE | 103 44 662 A | 5/2005 |
| EP | 1 227 027 A | 7/2002 |

OTHER PUBLICATIONS

PCT Search Report dated Jun. 16, 2010.

*Primary Examiner* — Tony Winner
(74) *Attorney, Agent, or Firm* — Hedman & Costigan, P.C.; James V. Costigan; Kathleen A. Costigan (57) ABSTRACT

A vehicle drive control system (1), such as a car, a boat, an aircraft and like, or of a driving simulator, such as a videogame console, simulation apparatuses and the like, and with a direction control device (2), such as a steering wheel, a rudder or the like, and with directioning means (21', 22', 21". 22"), said system (1) being characterized by means (6) for detecting a position of said direction control device (2), an adjustment module (7, 7', 7") having a frame, mechanically coupled with said direction control device (2), provided with passive actuator and adjustment means (8', 8", 8a, 8a', 8b, 8b') to adjust resistance to the movement of said direction control device (2), one or more sensors (27) for detection of position of said directioning means (21', 22', 21". 22"), and at least a central control unit (23).

27 Claims, 9 Drawing Sheets

(56) References Cited

U.S. PATENT DOCUMENTS

| | | |
|---|---|---|
| 6,336,519 B1 * | 1/2002 | Bohner et al. ............... 180/403 |
| 7,798,280 B2 * | 9/2010 | Simoni et al. ............... 180/403 |
| 8,066,091 B2 * | 11/2011 | Ito et al. ............... 180/403 |
| 8,162,095 B2 * | 4/2012 | Bootz et al. ............... 180/406 |
| 8,397,858 B2 * | 3/2013 | Krahn ............... 180/406 |
| 2003/0150366 A1 | 8/2003 | Kaufmann |

\* cited by examiner

DRIVE CONTROL SYSTEM

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM (EFS-WEB)

Not Applicable

STATEMENT REGARDING PRIOR DISCLOSURES BY THE INVENTOR OR A JOINT INVENTOR

Not Applicable

BACKGROUND OF THE INVENTION (1) Field of the Invention.

The present invention relates to a drive control system.

More specifically, the invention concerns a system of the above kind particularly studied and realised to vary resistance of steering wheel, a rudder or like of a vehicle, such as a car, a boat, an aircraft and like, but also console of a video game or of simulation apparatus, the latter being always more frequently used in developing cars, modifying the feeling felt while driving a vehicle by a driver.

In the following, the specification will be addressed, according to the specific cases, particularly to the control and driving of a boat or of a car, but it is well evident that the same must not be considered limited to this specific use.

(2) Description of Related Art

As it is well known, different kind of steering systems exist which are installed in different kind of vehicles. Steering systems are, as it is well known, driving assisting apparatus which are useful in different manoeuvring conditions.

Usually, steering systems have, on one side the aim of reducing the physical stress while controlling the vehicle in the different driving situations (for example power-steering for cars or hydro guide for trucks), and on the other side they should give a much more realistic control feeling, to give to the driver brain all the information about attitude and stability of the vehicle driven, in order to ensure maximum control and safety.

Electric/electronic steering systems presently available on the nautical market—but also in the industrial field—implement DC brushless electric motors. Said systems are also provided with electronic control units (ECU) piloted by sophisticated software.

Said brushless DC motors are directly mounted on the steering wheel support, in lieu of the steering wheel column, and can satisfy many driving comfort requisites. However, they do not always permit a realistic and comfortable guide in every manoeuvring situation.

For example, in the automotive field, traditional steering systems available on the market since many time can give a kind of feedback of the hydraulic/mechanic type thanks to the use of hydraulic pumps.

An advantage of this kind of systems is that of conferring a very fluid and continuous control and guide feeling, thanks to a purely mechanical control transmission, without mediation of electric systems.

Always in the automotive field, the so called modern/hybrid steering systems adopt, for example, as additional module, a stepwise DC or electric brushless motor with ratio gear directly mounted on the rack. However, also in this case, obtained control feeling is not always the best one possible.

Moreover, it must be remembered that rules exist in the automotive field that suitably adjust, under a safety point of view, elimination of fixed mechanical parts between steering wheel and hub holders.

It must be pointed out that this kind of limitative rules do not exist in the nautical field, where, as also for industrial fields such as shunters, cranes, lifting devices, heavy vehicles without number plate, ecc., different kind of electric steering systems are present.

In nautical field, said electric systems generically have an electric steering wheel, for example comprised of a unit with a brushless DC motor and a epicyclic reduction gear, which is used as direct support of the steering wheel and stepwise motor (stepper) acting in the rotative and submerged part.

Known solutions adapts the steering wheel rotative hardness, in different guide situations, e.g. by implementing DC brushless motors. However, said systems have different adjustment problems. In fact, if motor overheating occurs when torque must be braked (regardless this occurs to increase steering wheel rotation force or to create "virtual/electric stops"), heat generated during the "inertia braking" operations could also cause problems to the DC brushless motor thermal protection.

BRIEF SUMMARY OF THE INVENTION

In view of the above, it is therefore object of the present invention that of suggesting an adaptive steering system for controlling the driving of any kind of vehicle, such as a car, a boat and like, suitable to provide a control feeling of the same vehicle by a steering wheel, a rudder or like, and to be adjustable in the different guide or manoeuvring situations.

It is also object of the present invention that of suggesting a steering system wherein steering torque is generated by the driver while steering, rather than, according to the known technique, torque exerted by the driver is opposed to the torque generated by an active element, such as an electric motor.

It is therefore specific object of the present invention a vehicle drive control system, such as a car, a boat, an aircraft and like, or of a driving simulator, such as a videogame console, simulation apparatuses and like, said vehicle or simulator being provided with a direction control device, such as a steering wheel, a rudder or like, and with directioning means, said system being characterised in that it comprises means for detecting position of said direction control device, an adjustment module having a frame, mechanically coupled with said direction control device, provided with passive actuator and adjustment means by which it is suitable to adjust resistance to the movement of said direction control device by said passive actuator or adjustment means, on the basis of the position of said direction control device detected by said detection means, and to control direction of said vehicle or simulator by said directioning means and by said sensors.

Always according to the invention, said adjustment module can comprise a double chamber main container for a oily fluid, a worm screw, fixed at one end of said direction control device, a lead nut, engaged with said worm screw, a hollow piston, within which said worm screw is positioned, said hollow piston being provided with a seat within which said lead nut is housed, said seat being provided inside said main container, dividing it into said two chambers communicating by a channel, so that, by rotation of said worm screw, caused by movement of said direction control device, said lead nut moves longitudinally with respect to said worm screw along with said hollow piston and said seat, displacing oily fluid passing through said channel from one chamber to the other one, and in that said passive actuating or adjusting means are suitable to adjust flow of oily fluid passing through said channel.

Still according to the invention, said adjustment module can comprise a first and a second chamber, filled in with an oily fluid, a main worm screw and a lead nut engaged with said main worm screw, and a hollow piston, within which said main worm screw and said lead nut are placed, said hollow piston having such a shape to delimit said two chambers in communication by a channel, so that movement of said main worm screw with respect to said lead nut, and vice versa, causes longitudinal translation of said hollow piston, varying volume of said chambers, displacing oily fluid passing through said channel from one chamber to the other one, and said passive actuating and adjustment means can be suitable to adjust oily fluid flow passing through said channel.

Advantageously, according to the invention, said first and said second chamber can be delimited inside a main container, preferably a cylinder.

Furthermore, according to the invention, said main worm screw and said lead nut can be of the sphere recirculation type or of the ground trapezoidal type.

Always according to the invention, said actuating means comprise at least a valve suitable to adjust oily fluid flow passing through said channel.

Still according to the invention, said at least one valve is of the On/Off type; and/or that said at least one valve is of the On/Off bidirectional type, and/or that said at least a valve is of the proportional type, suitable to adjust the oily fluid flow partially passing through said channel; and/or comprising a valve of the opening/closure and proportional type; and/or of comprising a gliceur and/or manually operated flow rate valve; and/or comprising a first valve of the proportional type and a second valve of the opening/closure (On/Off) type; and/or comprising a first valve of the one-way pressure proportional type to which a relevant not return valve is coupled in parallel, connected between said chamber and said channel, a second valve of the one-way pressure proportional type to which a relevant not return valve is coupled in parallel, connected between said chamber and said channel, and a volumetric expansion chamber, a volumetric compensation piston, sliding within said volumetric expansion chamber and a buckling spring connected with said volumetric compensation piston.

Furthermore, according to the invention, said main container can comprise valve seats on the surface for installing said valves.

Advantageously, according to the invention, said passive adjustment means can comprise at least a gliceur and/or at least a manual adjustment flow rate valve.

Preferably, according to the invention, said oily fluid can be hydraulic oil and/or ATF (Automatic Transmission Fluid) and/or silicon based liquid.

Always according to the invention, said main worm screw can be fixed to an end of said direction control device and/or to said steering wheel column, and said hollow piston is provided with a seat within which said lead nut is housed, said seat delimiting said two chambers communicating through said channel, so that, following the rotation of said main worm screw, caused by the movement of said direction control device, said lead nut moves longitudinally with respect to said main worm screw along with said hollow piston and said seat, displacing oily fluid passing through said channel from one of said chambers to the other one, varying its volume.

Still according to the invention, said steering column can be fixed to said lead nut, and said main worm screw is fixed to said hollow piston.

Furthermore, according to the invention, said adjustment module can comprise a first return spring and a first washer and a second return spring, opposed with respect to said first return spring, and a second washer, so that when said steering column is rotated following the rotation of said direction control device, said main worm screw translates modifying volume of said chambers by said hollow piston and it is suitable to alternatively interact with one of said two washers, according to the translation direction, compressing the corresponding return spring in order to generate a return spring on said steering column.

Advantageously, according to the invention, said main worm screw can have a through longitudinal channel and comprises an projection within said through channel, and said steering column has an inner housing, and said adjustment module can comprise an adjustment shaft, in the intermediate portion of a circular projection and inserted within said longitudinal channel of said main worm screw, a first pre-loading ring nut, internally engaged by screwing with a first end of said adjustment shaft, and a second pre-loading ring nut, provided within said inner housing of the steering wheel column, said second pre-loading ring nut being integrally engaged by screwing with a portion close to a second end of said adjustment shaft by a threading inverse with respect to the threading of said first ring nut, said first return spring and said first washer being coaxial with respect to said adjustment shaft between said second pre-loading ring nut and said circular projection, said second washer being interposed between said second return spring and said circular projection, so that when said adjustment shaft is rotated, said pre-loading ring nuts approach or move away each other adjusting compression of said return springs between the same ring nuts and said circular projection, and when said steering column is rotated following the rotation of said direction control device, said main worm screw moves modifying volume of said chambers by said hollow piston and is suitable to interact by said inner projection with one washer or with the other one, according to the movement direction, compressing the corresponding return spring in order to generate a return torque on said steering column, leaving the other washer resting on said circular projection.

Always according to the invention, said main worm screw can have a longitudinal through channel and comprises an projection within said through channel, and said steering column has an inner housing, and said adjustment module can comprise a further worm screw, preferably a sphere recirculation worm screw, inserted within said longitudinal through channel of said main worm screw, a further lead nut, preferably a sphere recirculation worm screw, at least partially inserted within said worm screw and engaged with the same, an electric motor, preferably a brushless motor, connected by a flexible coupling with said further worm screw and controlled by said control central unit, so that, when said steering column is rotated following the rotation of said direction control device, said electric motor exerts a return torque on the direction control device when operated by said control central unit.

Still according to the invention, said further worm screw has a pitch lower than the pitch of said main worm screw, preferably with a pitch ratio between 3.3 and 30.

Furthermore, according to the invention it can comprise a compensation spring provided between said hollow piston and the frame of said adjustment module.

Advantageously, according to the invention, said central control unit can control said actuating means by modulated electric signals, preferably PWM (Pulse-width Modulation) signals.

Preferably, according to the invention, said central control unit can be a programmable unit, so as to permit different programs for calibration of resistance opposed to the movement of said device for controlling the direction, that can be selected by the user; said system being provided with interface means comprising means for selecting said programs and a control display.

Always according to the invention, said detection means can comprise one or more dynamic angular sensors.

Still according to the invention, said system can comprise at least a volumetric expansion chamber for said container chambers provided with a piston and retention means, such as a preloaded spring, provided in such a way that, if a set inner pressure threshold is passed within said chambers when varying the outer temperature, oily fluid therein flows within said volumetric expansion chamber making said piston retracting; if then temperature lower, said oily fluid returns from said volumetric expansion chamber to said container by the action of said piston and of said retention means.

Furthermore, according to the invention, said directing means can comprise one or more steering compartment piston—cylinder assemblies and one or more lifting piston—cylinder assemblies, respectively for controlling one or more nautical surface transmissions and actuation valves connected with said central control unit, for actuating said steering compartment piston—cylinder assemblies and of said lifting piston—cylinder assemblies.

Advantageously, according to the invention, said system can comprise one or more sensors of the Hall effect type or of the magneto resistive type, suitable to detect the position of said steering compartment piston—cylinder assemblies and of said lifting piston—cylinder assemblies.

BRIEF DESCRIPTION OF THE SEVERAL VIEWS OF THE DRAWINGS

Present invention will be now described for illustrative and not limitative purposes according to its preferred embodiment, with particular reference to the figures of the enclosed drawings, wherein.

DETAILED DESCRIPTION OF THE INVENTION

In the different figures, similar parts will be indicated by the same reference numbers.

Figure 1:
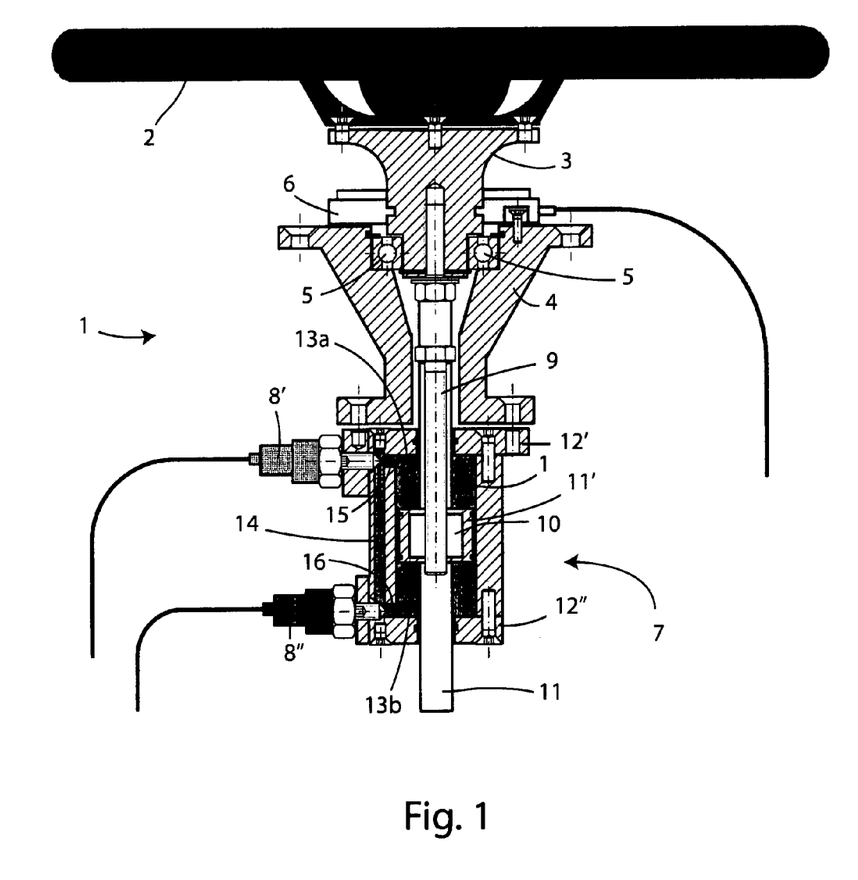
FIG. 1 shows a longitudinal section view of a steering system for controlling the driving of a vehicle according to the invention.

Making reference to FIG. 1, it is possible observing the section view of a system 1 for controlling driving of a vehicle (not shown in the figure), such as a boat or a car, according to the present invention.

Steering wheel 2 is fixed to its own support 3, which is rotably coupled with a steering column 4 by sphere bearings 5.

A dynamic angular sensor 6 is installed on said support, suitable to detect the position of the steering wheel 2, i.e. the rotation angle with respect to a reference position.

Said dynamic angular sensor 6 is connected by an electric cable 6' with a central control unit (not shown in the figure), the function of which will be better described in the following.

System 1 also provides a first embodiment of an adjustment module, indicated by reference number 7, mechanically connected with said steering wheel 2. Said adjustment module 7 is provided with actuating means 8', 8", by which it can adjust resistance to the steering wheel 2 rotation, thus varying according to the needing tactile feeling for controlling vehicle by the driver.

Furthermore, said adjustment module 7 comprises a worm screw 8 or nut screw) 9, fixed to said support 3 of the steering wheel 2, and engaged by threading with a lead nut 10.

Adjustment module 7 also comprises a hollow piston 11, provided with a cylindrical seat 11', substantially in its intermediate portion, within which said lead nut 10 is housed.

Said hollow piston 11 is placed within a main container or cylinder 12, of the double chamber or tandem type, comprised of two lids 12', 12", within which oil drainage screws are provided. Said seat 11' divides said main container 12 into two different chambers 13a and 13b, communicating by a channel 14.

Said main container 12 is filled in with oily fluid, particularly hydraulic oil or ATF (Automatic Transmission Fluid) and/or with silicone based liquid and/or synthetic fluids.

Finally, said adjustment module 7 comprises a first and a second valve seats 15 and 16, wherein said actuating means are installed, said actuating means being comprised in the present embodiment with a first and a second valve 8' and 8". Said valves 8' and 8" are connected and controlled by said central control unit.

Particularly, in the present embodiment, said first valve 8' is of the proportional type and it is suitable to gradually close or to open said channel 14, while said second valve 8' is suitable to close or to open said channel (ON/OFF mode).

Main container 12 can comprise, for each one of said chambers 13a and 13b, an outer expansion chamber (not shown in the figure), each one communicating with the relevant chamber 13a or 13b. This permits compensating expansion of said oily fluid with variation of the outer temperature.

Furthermore, said further expansion chambers are provided with a piston and with retention means, such as a pre-loaded spring, provided in such a way that, in case the oily and/or synthetic fluid pressure passes a set threshold, part of the same fluid can transfer within said outer expansion chambers. Thus, it is possible keeping uniform pressure within each one of said chambers 13a and 13b. Instead, if temperature lowers, said oily fluid is forced to come back from said expansion chambers to the relevant chamber 13a or 13b of said main container 12 by the action of said piston and of said spring.

It is also possible providing a single outer expansion chamber communicating with both chambers 13a and 13b.

Central control unit controls and manages vehicle directioning means, such as steering compartment piston—cylinder assembly and lifting piston—cylinder assembly for a nautical vehicle, or a rack or other actuating means for a car. In order to permit said control, said central control unit can detect position of said directioning means by one or more position detection sensors.

Operation of the system 1 according to the invention provided on a nautical vehicle will be described in the following.

First proportional valve 8' or second ON/OFF valve 8" are connected to the on-board supply system and to the central control unit.

Central control unit transmits a frequency signal, preferably a PWM (Pulse-Width Modulation) signal, to solenoid of one of valves 8' or 8", thus controlling position/diameter of the passage hole within the same valve.

Thus, diameter of passage through channel 14, e.g. of the first proportional valve 8' is modified by a set minimum amount to a set maximum amount. This solution permits managing by maximum precision passage of fluid from one chamber 13a to the other one 13b of the main container 12 during rotation of the steering wheel 2.

Reducing diameter of channel 14, it will be obtained a steering wheel 2 operating force higher (twisting moment/torque), while increasing passage diameter, a lower operation force will be obtained.

It must be taken into consideration that it is possible preventing the use of valves 8', 8", introducing one gliceur only within channel 14. In this case, virtual end stroke effect cannot be obtained.

Each configuration can provide to the manufacturer, but also to the vehicle driver, e.g. during sport races, possibility of choosing necessary force (torque) in order to rotate steering wheel 2.

Dynamic angular sensor 6 transmits position of steering wheel 2 with respect to the zero position of the steering system, in real time to the central control unit, and said central control unit interacts with said first 8' and second 8" valves, and possibly with position transducers and/or with inclinometers integrated within the movable/mechanical/hydraulic portion of the system 1.

Software installed within the central control unit adjusts both opening and closure of said valves 8', 8".

As it can be observed, control of said first 8' and second 8" valves, being able hermetically closing passage of oil through channel 14 between chambers 13a and 13b, will guarantee "hydraulic stroke end" for steering wheel 2, when it has reached, according to one rotation direction, a set maximum angular value by the same software mapping.

"Hydraulic blocking" of hollow piston 11, and thus of the steering wheel 2 rotation, occurs hermetically separating the two chambers 13a, 13b of the main container 12.

Since said main container 12 is fully filled in with hydraulic oil or with ATF, force/inertia that can be exerted manually acting on steering wheel 2 will be never enough to compress fluid within one of chambers 13a or 13b, this due to the compressibility module. Without the reduction of the volume within one of said chambers 13a, 13b, hollow piston 11 will be never able to move.

First proportional valve 8', or alternatively second ON/OFF valve 8", or alternatively gliceur of manual flow rate adjustment valve permit passage of oily fluid through channel 14 only when rotation direction of the steering wheel 2 is changed.

It must be taken into consideration that, while central control unit calibrates resistance to movement of said direction control device 2, it adjusts at the same time, direction of motion of said vehicle by said directioning means.

Change of steering wheel rotation direction is detected by the same dynamic angular sensor 6, so that central control unit processes data received from said dynamic angular sensor 6 and opens again channel within few milliseconds acting of said valves 8' and/or 8", thus releasing hollow piston 11, permitting to the steering wheel 2 the rotation up to its stroke end on the basis of the chosen operation software configuration.

Figure 2:
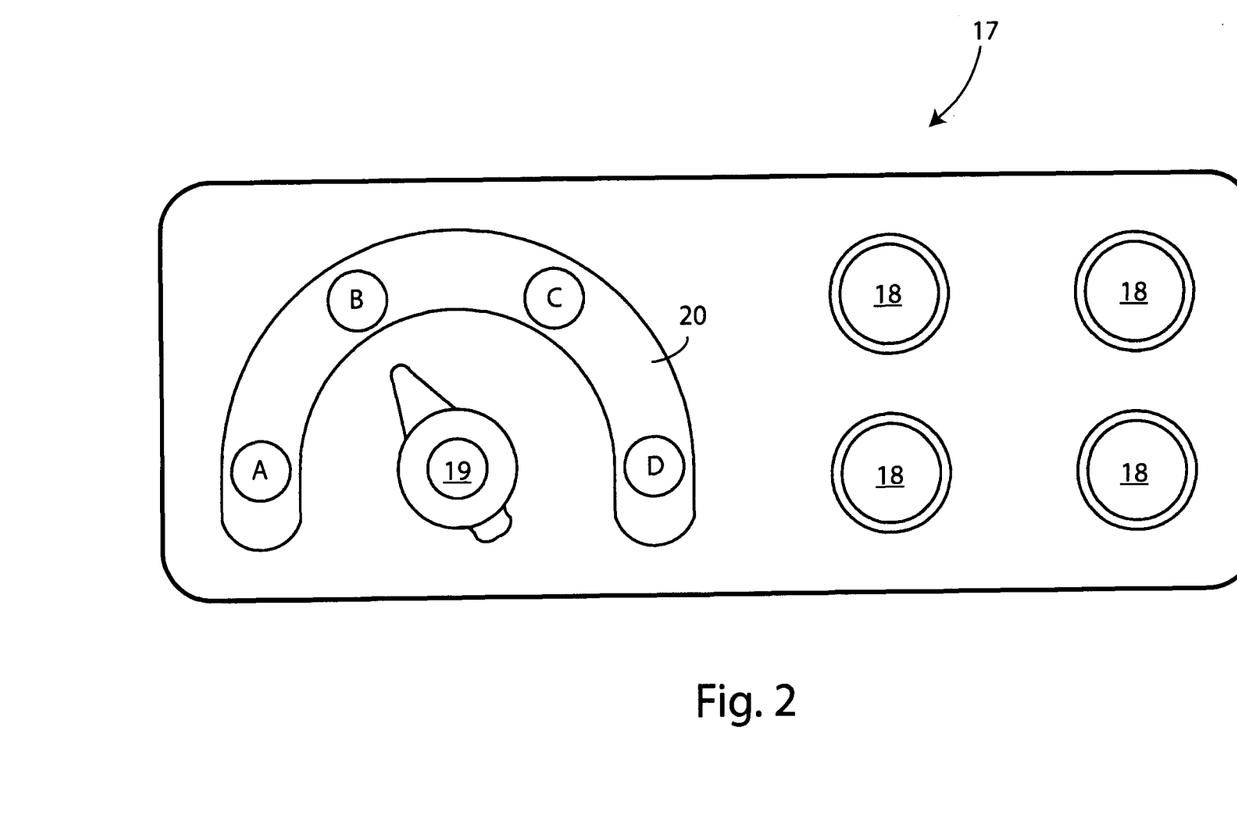
FIG. 2 shows a pushbutton panel of the system according to the present invention.

System 1 preferably also comprises a push button panel 17, such as the one shown in FIG. 2, provided with push buttons 18 and with a selector 19, for choosing the different operative configurations 20 of the adjustment module 7 that can be programmed beforehand within the central control unit. Thus, it is possible obtaining a high number of variations of the steering wheel 2 movement, that can directly or indirectly act on steering compartment or on transmission of every kind and dimensions boat, or on all the others steering systems and their various connection levers of hub holders connected with wheels, chains, ski and like, thus permitting interacting with vehicle motion direction, on the sea, on the ground or in the air.

Moreover, the system 1 according to the invention is very flexible. In fact, movements of the various parts involved (steering compartment, hub holders, ecc.) can be also carried out by electric and/or hybrid actuators. Said electric and/or hybrid actuators can be controlled by an assembly of sensors and electronic units, in order to provide the most realistic control feeling. On the other hand, driving feeling will be realistically maintained, since it is mediated by hydraulic type means.

Figure 3:
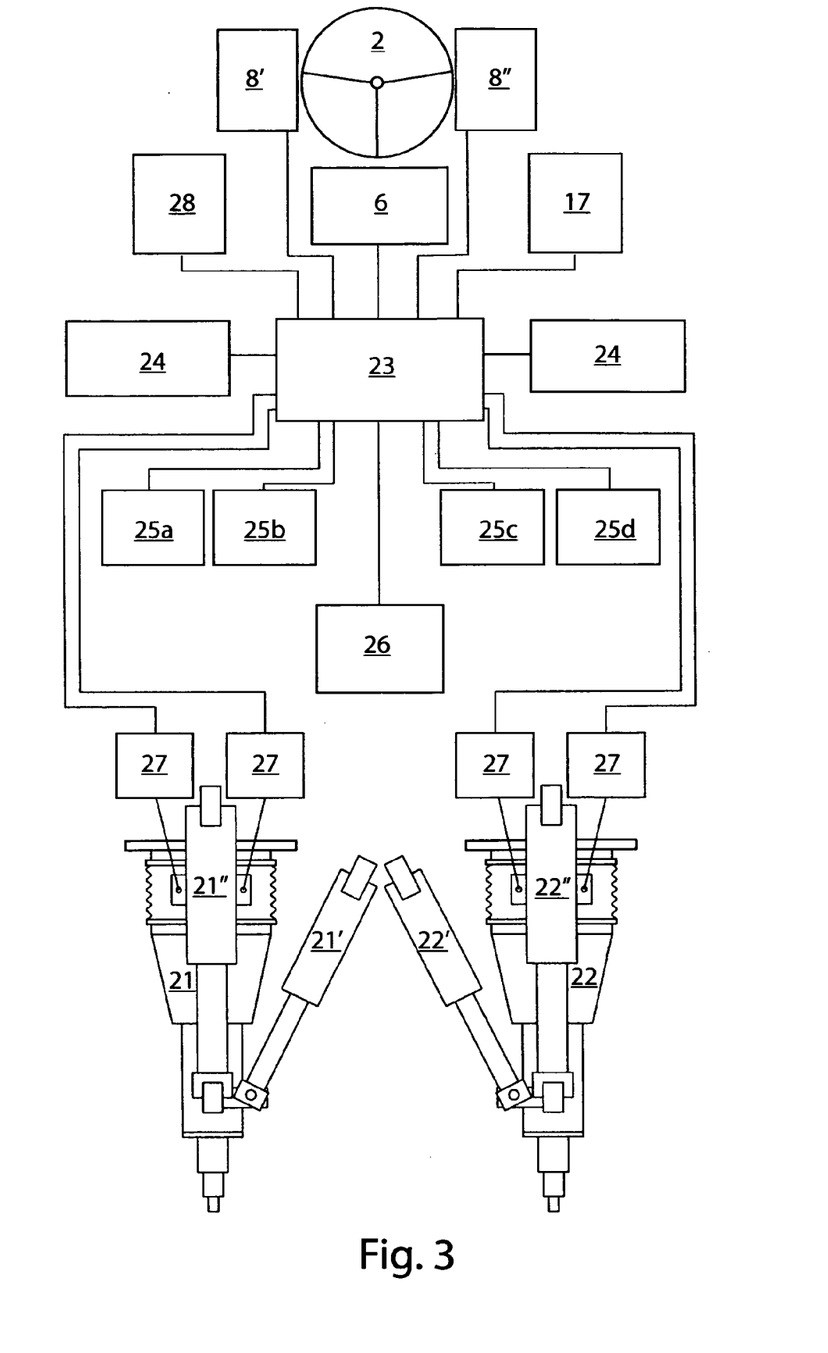
FIG. 3 shows a block diagram of the connections of a system according to the present invention.

FIG. 3 shows the block diagram of connections of a control system for a nautical surface transmission pair 2 and 22. Each one of said surface transmissions 21 and 22 comprises a steering compartment piston—cylinder assembly 21', 22' and lifting piston—cylinder assembly 21", 22" as directioning means.

As it can be observed, central control unit 23 (ECU) is provided at the centre of the system 1, supplied by two supply batteries 24.

Dynamic angular sensor 6, said first 8' and second 8" valves, and control valves 25a, 25b, 25c and 25d, for operation of said steering compartment piston—cylinder assembly 21', 22' and lifting piston—cylinder assembly 21", 22", are connected to the central control unit 23.

Therefore, central control unit 23 is connected to detection means, i.e. to the dynamic angular sensor 6, to the actuating means 8', 8", to sensors for detection of the position of directioning means and to the same directioning means.

System 1 also comprises a hydraulic pump 26, connected and controlled by said central control unit 23, suitable to supply said steering compartment piston—cylinder assembly 21', 22' and lifting piston—cylinder assembly 21", 22".

Hall effect sensors 27 are provided on surface transmissions 21 and 22, connected with said central control unit 23, each one suitable to detect position of said steering compartment piston—cylinder assembly 21', 22' and lifting piston—cylinder assembly 21", 22".

Finally, this system 1 is also provided with a control display 28 and with a push button panel 17.

In this case too, system 1 permits different possibilities for adjusting hydraulic stroke end (before reaching mechanical stroke end) and to give operative "hardness" to the adjustable steering wheel 2.

As it can be observed, in this case central control unit can, on the basis of the selected operative program of:
- controlling driver rudder feeling driving, thanks to said first and second valves 8' and/or 8";
- detecting the position of the steering compartment piston—cylinder assembly 21', 22' and lifting piston—cylinder assembly 21", 22" by said Hall effect sensors 27;

Acting on control valves 25a, 25b, 25c and 25d and on hydraulic pump 26 for moving said steering compartment piston—cylinder assembly 21', 22' and lifting piston—cylinder assembly 21", 22". A first example of adjustment program that can be implemented in the central control unit 23 and that can be particularly applied to the system configuration as shown in FIG. 3, has the following requisites:
- steering wheel 2 rotation: starting from position zero, steering wheel perfectly centred, with a 180° maximum rotation leftward and rightward;
- steering compartment movement or excursion: steering compartment will have to move starting from mechanical zero (steering compartment perfectly centred) up to the steering compartment mechanical stroke end fully on the right and fully on the left.

In this case, central control unit 2 activates first proportional valve 8' and/or second ON/OFF valve 8"m closing the same simply cutting off electric supply of valve 8' or 8", as soon as steering wheel 2, or 180° rightward, or 180° leftward positions will be reached, i.e. positions that are recognised by central control unit 23.

Thus, steering wheel 2, starting from position zero, cannot rotate beyond 180° according to each one of the rotation directions, which, in this final position, has reached its maximum set rotation angle, and thus its hydraulic stroke end (obviously not its mechanical stroke end).

In a second example of adjustment program that can be implemented within central control unit 2, always making reference to FIG. 3, the following requisites are taken into consideration:
- steering wheel 2 rotation: starting from position zero, steering wheel centred, with a 360° maximum rotation leftward and rightward;
- steering compartment movement or excursion: steering compartment will have to move starting from mechanical zero (steering compartment centred) up to the steering compartment mechanical stroke end fully on the right and fully on the left (from abutment to abutment).

In this case, first proportional valve 8' (or second valve ON/OFF 8") directly mounted on main container 12 will close channel 14 as soon as maximum positions of the steering wheel 2, set 360° rightward or 360° leftward, are reached, and consequently recognised by central control unit 23.

Steering wheel 2, starting from zero position, cannot rotate beyond 360° in both directions, thus in this final position, program implemented indicates that its maximum rotation angle has been reached and thus that hydraulic stroke has been reached.

By starting rotation of the same steering wheel 2, taking into consideration selection already made by push button panel 17 and processing different values detected by different sensors, central control unit 23 activates hydraulic pump 26 and control valves 25a, 25b, 25c and 25d according to a set mode, acting directly on said steering compartment piston—cylinder assembly 21', 22' and lifting piston—cylinder assembly 21", 22".

Real time effective position of the different mechanical/hydraulic compositions detected by dynamic angular sensor 6, by Hall effect sensors 27 and by possible inclinometers integrated within the movable/mechanical and hydraulic part of system 1, it will be constantly transmitted to said central control unit 23, in order to permit to the same processing data, different safety controls and managing of closed circuit system.

As far as safety is concerned, possibility of programming system 1 by software permits setting beforehand/configuring ratio between maximum rotation/angular movement speed of vehicle steering wheel and the consequent reaction of levers, cylinders, and possible electro actuators. Therefore, if a sudden system 1 driving manoeuvring occurs, can—taking into consideration different parameters that could be speed, load, inclination, ecc.—make it levers or electro hydraulic actuators carrying out steering movement or manoeuvre with a suitable speed in order to maintain vehicle safety.

This permits preventing upturning, side skidding, possible losses of load on heavy trucks and generally speaking every dangerous situation.

Finally, it must be taken into consideration that for electro-mechanical applications it will be sufficient e.g. installing stepwise brushless DC motors with gear wheels in lieu of control valves 25a, 25b, 25c and 25d.

In a further embodiment, system 1 permits a feed-back acting not only on "steering wheel hardness", which is set by manufacture acting on software, but that can be also adjusted by the user using the interface means (display, keyboard/pushbuttons) with which it is possible tuning PWM frequency and thus the steering wheel rotation torque.

Moreover, this hardness can also evenly vary according to the different situations, such as geometrical reaching of the stroke end by a hub holder.

In other words, if system 1 would include one or more electro actuators acting as directioning means, connected with wheels, for example vehicle wheels, it could send to the central control unit 23, as additional information, current or power absorption by the operating activated device, or sending data packages, always to the control unit 23, acquired by using load cells (strength gauge) detecting inertia on connection levers and consequently adjusting proportional valve 8", reducing or increasing rotational torque necessary to operate steering wheel.

Further embodiments of the system 1 for controlling a vehicle driving will be described in the following.

Figure 4:
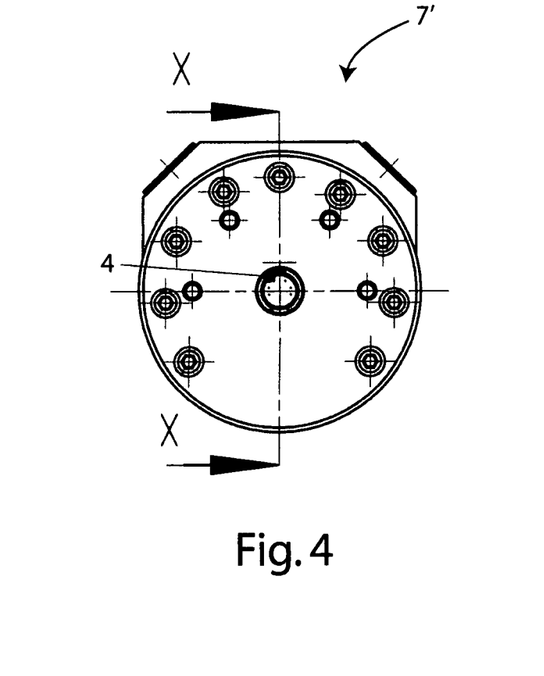
FIG. 4 shows a transverse view of an adjustment module assembly of the system for controlling the driving of a vehicle.
Figure 5:
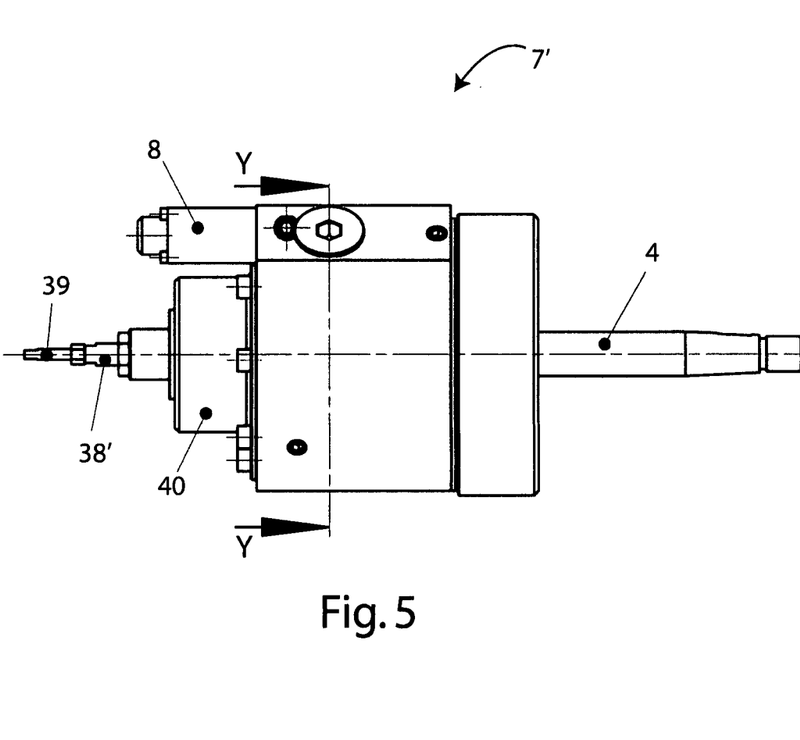
FIG. 5 shows a longitudinal view of the assembly of the adjustment module according to FIG. 4.

FIGS. 4 and 5 show an assembly of the adjustment module 7' of the system for controlling the guide of a vehicle according to the present invention, which is really compact. Steering wheel column 4 can be observed from the figures.

Figure 6:
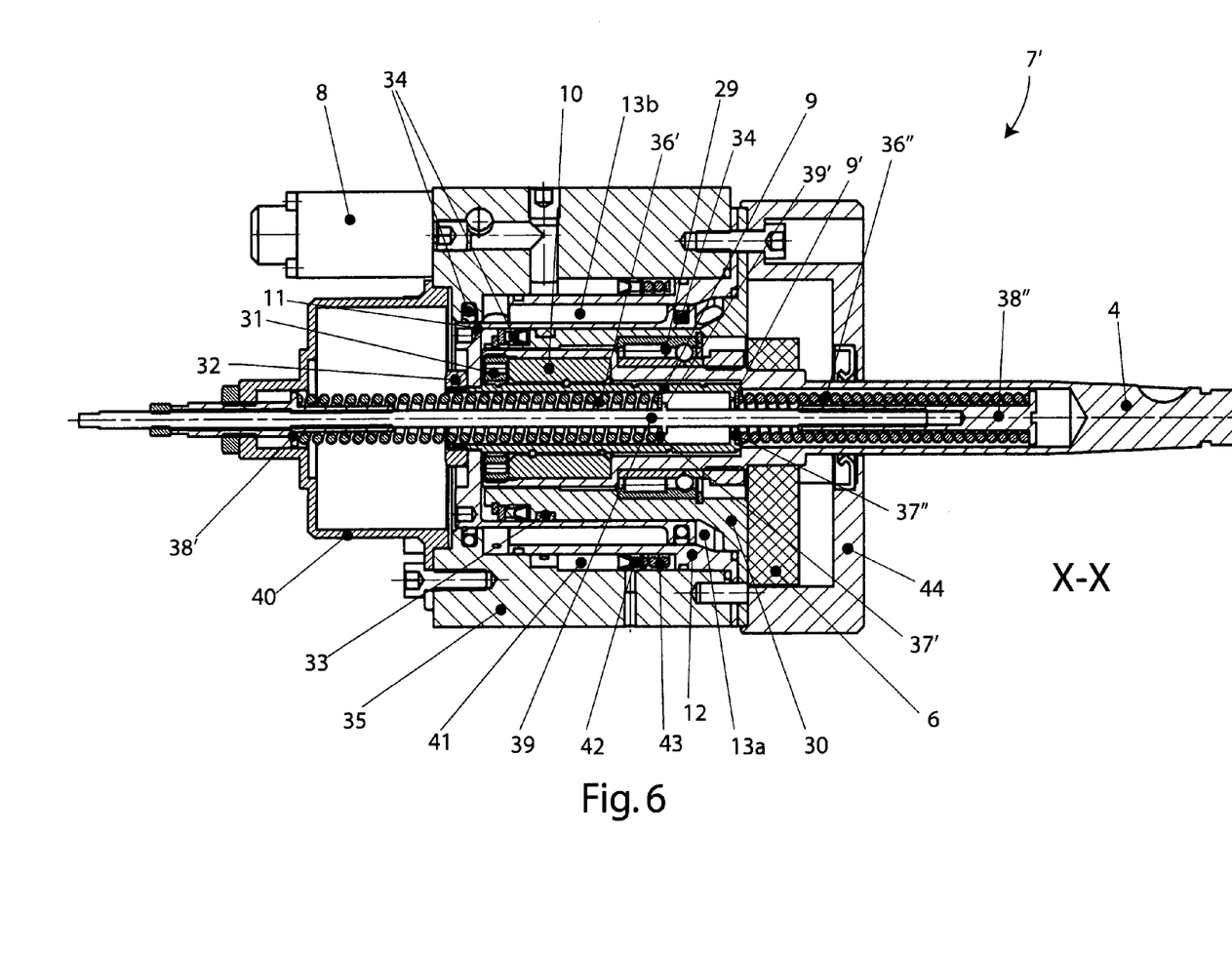
FIG. 6 shows a view taken along section X-X, of a second embodiment of the adjustment module of the system for controlling the vehicle driving in an end position.
Figure 7:
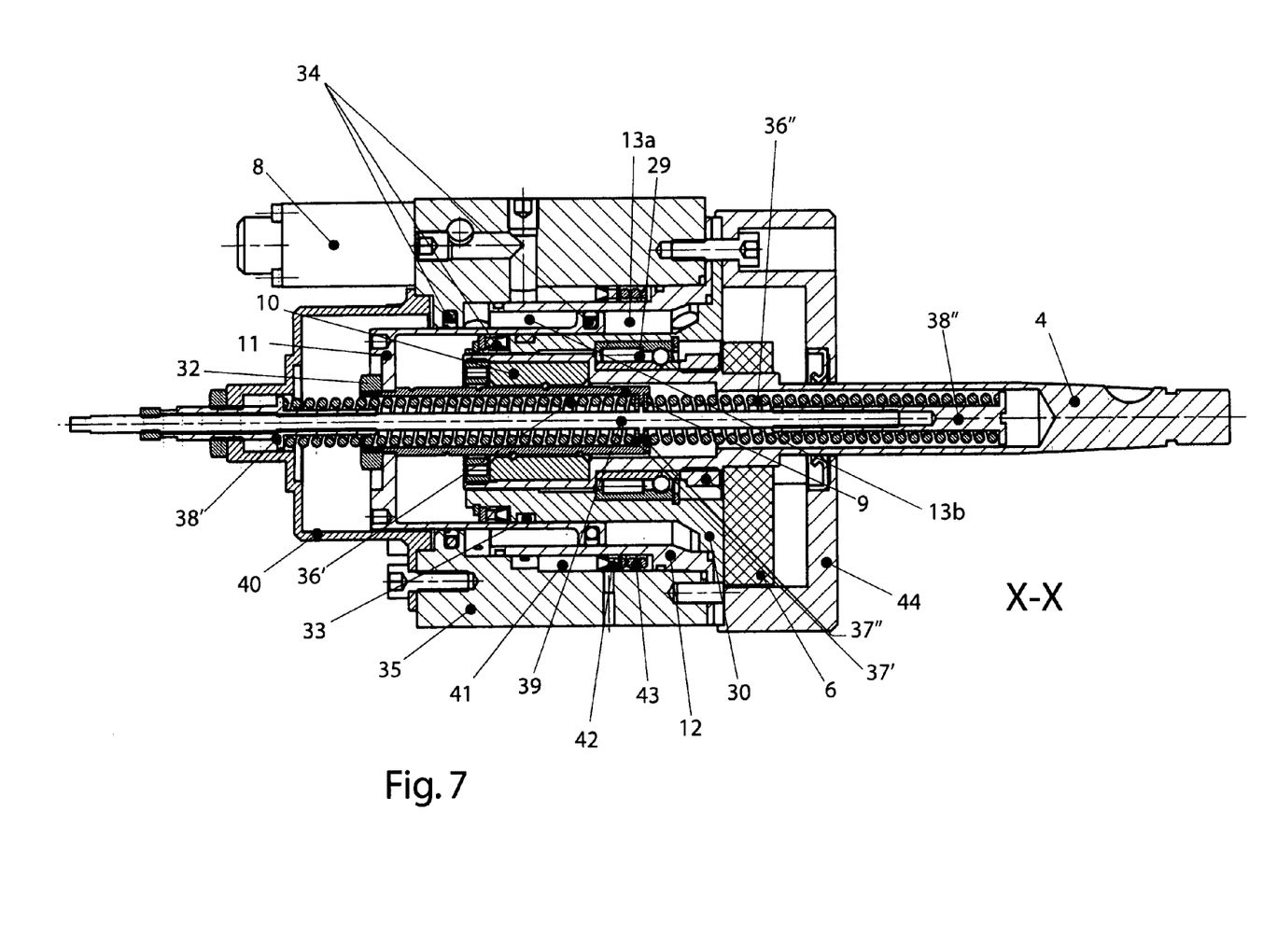
FIG. 7 shows a second embodiment of the position adjustment module in a 0° steering angle position.

Making now reference to FIGS. 6 and 7, it is observed a second embodiment of the adjustment module 7', providing a steering wheel 2 return mechanism (self-centring tendency), that in this case does not require electric power.

Steering column 4 is rotably placed by pins/spheres bearing 29 within housing 30. Lead nut 10 is of the sphere recirculation type and it is fixed within steering column 4 by tightening nut 31, so as to prevent rotation between said lead nut 10 and said column. Worm screw 9 is within the steering column 4. Piston 11 is fixed to the sphere recirculation worm screw 9 by a fixing nut 32.

Central axis of piston 11 rotates symmetrically and it is positioned offset with respect to the central axis of the recirculation worm screw 9. This position prevents a rotation of the worm screw 9, thus making the latter translating only according to longitudinal axis direction.

Piston 11 has housing 30 by its "pot" shape. Piston guide 33 and hydraulic sealings 34 are placed between housing 30 and piston 11. At the bottom, it is observed a housing 35 for valves 8 about piston 11, and first and second chambers, respectively 13a and 13b, are realised, that can create hydraulic pressure—independently each other—by hydraulic sealings 34.

In this embodiment, return springs 36' and 36" are provided inside the worm screw 9, which is hollow, with a longitudinal channel, as it is observed from figures, and of the steering column 4, which is hollow as well.

Return springs 36' and 36" abut on one side against respective washers 37' and 37", which are provided spaced from the opposite sides on a circular projection 39' within the central portion of said worm screw 9. Return spring 36" has its other end abutting on preloading nut 38"; while return spring 36' has its other end abutting against preloading nut 38'. Said preloading nuts 38' and 38" are threaded on adjustment shaft 39. Particularly, said preloading nut 38' has a leftward threading, and, as already said, it is coupled on the adjustment shaft, as well as screwed on spring seat lid. By rotation of adjustment shaft 39, preloading nuts 38' and 38" symmetrically modify their position, due to the different threading. Thus, it is possible symmetrically modifying preloading of return springs 36' and 36". Return springs 36' and 36" and preloading nuts 38' and 38" are note engaged with inner walls of their seats. i.e. sphere recirculation worm screw 9 and steering column 4, thus permitting to the assembly to freely rotating about the return springs 36', 36", preloading nuts 38', 38" and adjustment shaft 39.

The above spring 36' and 36" adjustment system permits to the manufacturer to individuate the most suitable active return pair. Particularly, once individuated the preferred pair, it is possible eliminating all the adjustable portion (nuts 38', 38", possibly adjustment shaft 39, ecc.) and inserting springs with a fixed adjustment.

Integrated volumetric expansion chamber 41 is placed between valve seat 35 and cylindrical container 12.

Said volumetric expansion chamber 41 is suitable to compensate volumetric expansion of hydraulic fluid at different environment or exercise temperatures (as it is well known, mechanical friction generates high temperature), so as to obtain a substantially always uniform exercise pressure.

A volumetric compensation piston 42 is provided within volumetric expansion chamber 41, which is subjected to an elastic force developed by spring 43 directly acting on volumetric compensation piston 42. Thus, pressure within two chambers 13a and 13b with the system at rest only depends on elastic force of spring 43 and not on environment or exercise temperature.

Figure 8:
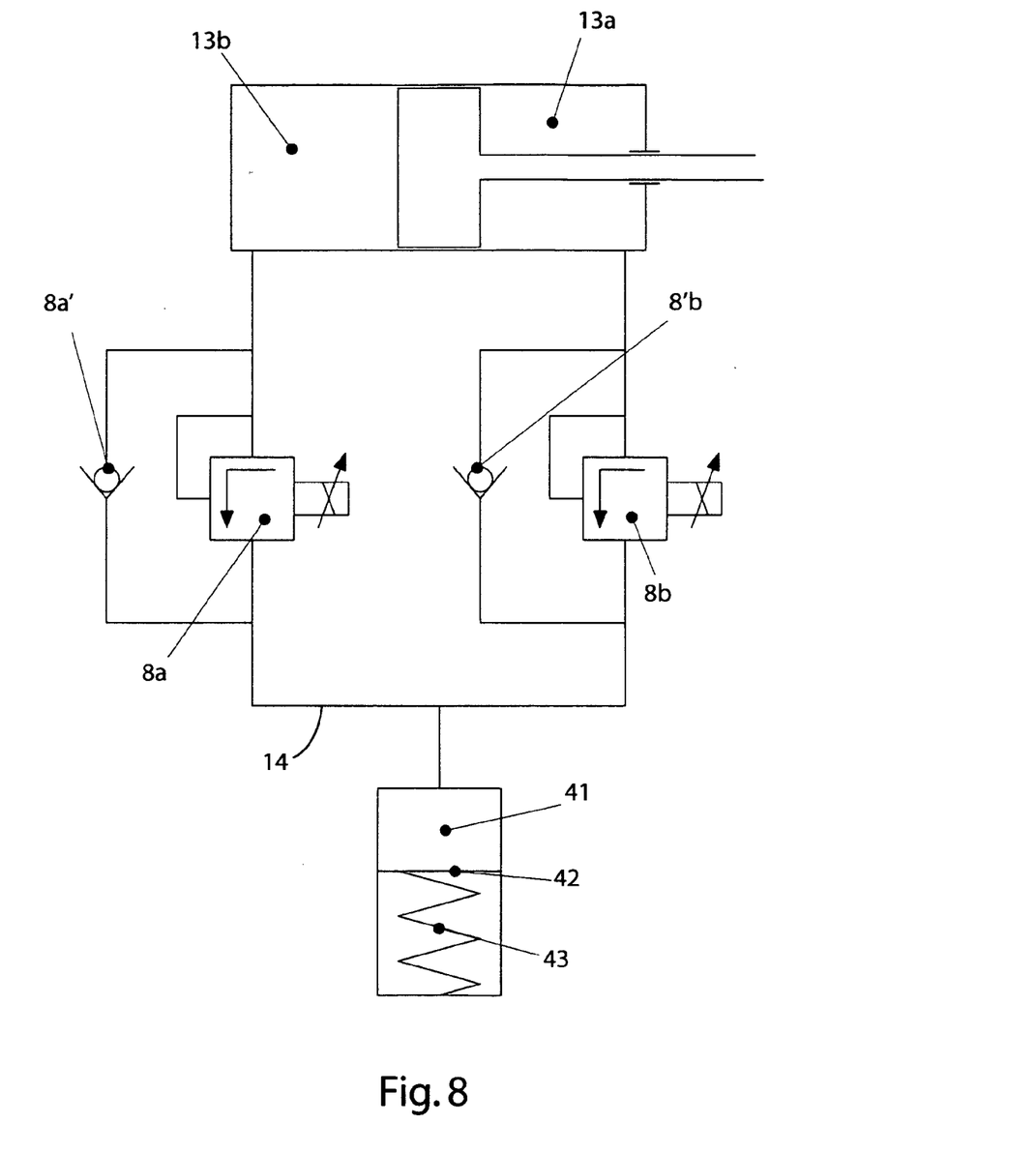
FIG. 8 shows a hydraulic scheme of a second embodiment of the adjustment module.
Figure 9:
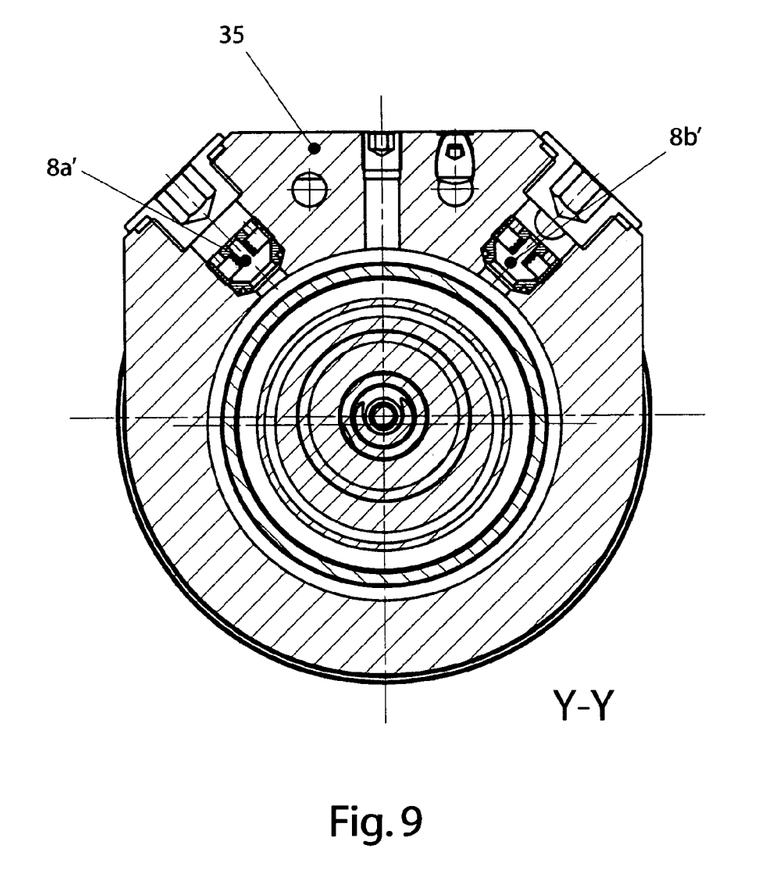
FIG. 9 shows a view taken along Y-Y of the second embodiment of the adjustment module of the system for controlling the vehicle driving in an end position.

Within the valve seat 35, two pressure proportional valves 8a and 8b and two one way valves 8a' and 8b', shown in FIG. 8 showing hydraulic scheme of steering actuator, and in FIG. 9, showing a further section of the adjustment module 7', are provided.

Steering shaft housing 30, cylindrical container 12 and housing 35 are assembled in such a way to create a single unit or assembly. Dynamic steering angular sensor(s) 6 are provided within flange 44.

Making the steering column 4 rotating, worm screw is operated by sphere recirculation lead nut 10, so as to translate along its longitudinal axis. Lead nut 10 is fixed to hollow piston 11, which is guided by cylindrical container 12 having a longitudinal axis not coincident with the rotation axis of lead nut 10.

According to rotation direction of steering column 4, hollow piston 11 moves forward or backward and chambers 13a and 13b vary their volume. Therefore, if hollow piston reduces chamber 13b, hydraulic fluid flows from the latter, passes through the relevant pressure proportional valve 8a and the one-way valve 8a' of chamber 13a, that at the same time increases its volume. By the pressure proportional valve 8a it is now possible creating a pressure within the corresponding chamber 13b during the active steering steps. The above pressure depends on electric current flow exciting solenoid of proportional valve 8a.

Pressure proportional valves 8a and 8a' permit maintaining constant the torque regardless fluid viscosity, and thus temperature. Thus an contrast torque develops on steering column, which is opposed to the rotation direction. Said torque does not depend on the rotation speed of the steering column 4, as well as it is independent with respect to the hydraulic fluid thermal conditioning. Torque only depends on the electric current flow.

Changing the rotation direction of the steering column 4 with respect to the above situation, e.g. if a vehicle driver must avoid an obstacle, it is changed flow direction of hydraulic fluid. In this case, chamber 13b increases, while chamber 13a would reduce its volume. Pressure within chamber 13a, adjusted by pressure proportional valve 8b, determines torque on steering column 4. This means that, modifying the rotation direction functions of pressure proportional valves 8a and 8b are modified at the same time and independently each other.

If, for example, rotation described would be the start of a curve, it would be possible adjusting, acting on pressure proportional valve 8a, a rotation torque which is deemed suitable/ideal to the trajectory of the car or other means. Changing of the rotation direction would be equivalent to bring volume 2 to the straight trajectory. In this case, rotation torque would be much lower than that required in case a curve is made. This lower rotation torque can be set beforehand acting on pressure proportional valve 8b. This means that while steering column 4 is still during the curve direction rotation step, and by pressure proportional valve 8a it is recorded/managed a set rotation torque, it is possible setting an optimum return torque on pressure proportional valve 10b, always acting on steering column 4.

On the basis of the above, system 1 does not require real time intervention of electronic/ECU—acting along with steering actuator—reading/detecting exact position of steering column 4 by dynamic angular sensor 6, in order to modify torque acting on steering column 4. These adjustments of relevant pressure proportional valves 8a, 8b, can be anticipated by the following inversion of the rotation by a suitable software mapping. This would permit guaranteeing that wished return torque is always available, electronic cannot delay by valve piloting, it does not begin with piloting only during inversion of rotation, but anticipates the same.

The steering actuator user in most cases expects during rotation inversion an instantaneous reaction of the rotation torque acting on steering wheel. This is the reason why present hydraulic scheme is advantageous.

Many rotation instantaneous torques developing during steering column 4 rotation inversion can be obtained without delay that would be possibly caused or conditioned by acquisition and parametrisation of different real time parameters.

As it can be observed from figures, chambers 13a and 13b have different dimensions, this being due by the hollow piston 11 shape. Chamber 13a has a larger size than chamber 13b. Therefore, hydraulic fluid volume flowing following the reduction of chamber 13b volume is larger than chamber 13a volume, which increases at the same time. This volume difference remains within the volumetric expansion chamber 41. During the inversion of the steering column 4 rotation, this volume difference accumulated within the volumetric expansion chamber 41 again flows within the chamber 13b, the volume of which increases.

Due the different dimensions of chambers 13a and 13b, a rotation torque acts on steering column 4 even with steering actuacting means at rest. In the following it will be described the action of the return springs 36' and 36", when steering wheel 2 is rotated, worm screw 6 moves, modifying volume of chambers 13a and 13b as described in the above and, at the same time, said worm screw 9 intercepts one of the two washers 37' or 37" by an inner projection 9', obtained within said hollow worm screw, leaving the other washer at rest. Thus, said worm screw 9 presses one of the two return springs 36' and 36" particularly, in FIG. 6, worm screw 9 intercepts washer 37", compressing return spring 36".

Compressed return spring 36' or 36", on the basis of the steering wheel 2 rotation direction, exerts an "active" additional rotation torque, i.e. independent from action of the driver acting on steering wheel 2, aiming to make steering wheel returning to the 0° position.

Figure 10:
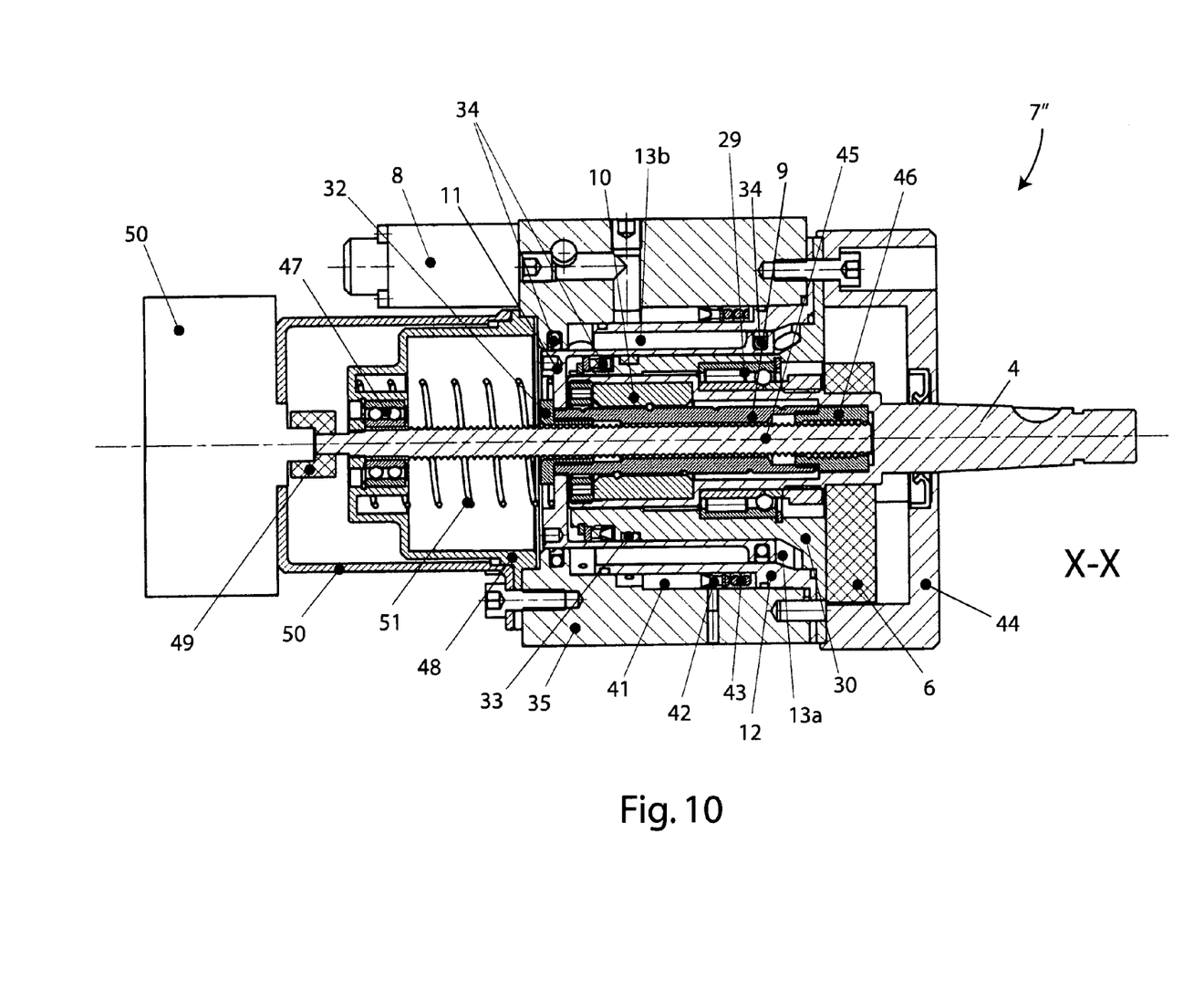
FIG. 10 shows a view taken along section X-X of a third embodiment of the adjustment module of the system for controlling the vehicle driving in an end position.

FIG. 10 shows section X-X of a third embodiment of adjustment module 7' that in this case is provided with steering wheel 2 return means, in this embodiment supplied electrically. Said adjustment module 7" comprises a further worm screw 45, of the sphere recirculation type, provided inside the sphere recirculation worm screw 9.

Said further worm screw 45 is engaged with a further lead nut 46, which is of the sphere recirculation type. Said further lead nut 46 is at least partially inserted within and engaged with said worm screw 9. The further worm screw 45 is rotably housed within bearing 47, having its seat within the bearing 48 lid.

An elastic joint 49 connects output shaft (not shown in figure) of an electric engine 50, preferably of the brushless type, mounted on a support 50' with a further worm screw 45.

Worm screw 9 and 45 pitches define a transmission ratio between steering column 4 and electric motor 50.

Assuming pitches between 10 and 30 mm for worm screw 9 and between 1 and 3 mm for said further worm screw 45, possible transmission ratios are obtained between steering column 4 and electric motor 50 between i=3.3 and i=30.

Moreover, it must be taken into consideration that at rest, pressures within the hydraulic system are the same. This means that identical pressures act within chambers 13a and 13b on surfaces having different dimensions. Thus, a free force is created, acting on hollow piston 11, and consequently on steering column 4. This force can induce a rotation movement on steering column 4. A friction force opposes to the above force, said friction force being caused by elastic sealings, by lead nut friction torques 10 and worm screw 9, and by elastic force generated by a compensation spring 51, which will be adapted so as to prevent that steering column 4, under a rest mode of the adjustment module 7", can rotate by itself. Spring 51 is housed, on one end, within a suitable circular seat obtained on the outer part of the hollow piston 11, and on other side a further seat of a circular spring obtained within the lid of the bearing 48 faced toward the bearing.

Electric motor 50, thanks to the above transmission ratio between said worm screw 9 and said further worm screw 45, as well as by the suitable programmable control of said central control unit 23 permits both exerting an "active" return torque on steering wheel 2, exactly as made by return springs 36' and 36" of the second embodiment, but in this case, said torque can be linear (as the action of a spring) or not linear, according to the programmable control of said central control unit 23, so as to realise any other driving simulation effect.

Therefore, taking into consideration the second and the third embodiment described with reference to FIGS. 6-9, it is obtained that, as an addition to the hydraulically generated torques, acting on steering column 4, and that can have only a passive effect 8 this meaning that hydraulic creates a torque only when the operator generates a rotation) there are obtained torques generated by brushless electric motor 50 and return springs 36' and 36", and they are active torques.

Passive torques are hydraulically generated and act on steering column 4, and consequently on steering wheel 2, suitable to simulate high rotation torques that the driver expects finding during the driving when curving or during simulation of virtual stroke ends. In these cases it is possible simulating large torques with a very limited power.

Brushless motor 50 and return springs 36' and 36" are particularly suitable to generate an active torque and can simulate/generate contrast torque on steering column 4.

During introduction of rotation movement by steering column 4, it is actuated only one of the two return springs 36' and 36", on the basis of the rotation direction. Since return springs 36' or 36" can be mounted with a preloading, it is possible generating a quite high contrast/return torque even with reduced steering angles.

While return springs 36' or 36" creates only a return torque, brushless electric motor 50 of the third embodiment of adjustment module 7" can generate adjustable high torques on steering column 4 in both the rotation directions.

By the use of the two sphere recirculation lead nuts 9 and 45, it is developed a reduction unit that, contrary to gear systems, produces torques that do not generate tactile feeling of the mechanical pitch. By the proper choice of spheres, worm screws and lead nuts can be realised quite easily and without axial clearances. An advantage of the present invention is thus that, by sensors and active feedback, it is possible realistically reproducing any vehicle driving condition.

The present invention has been described for illustrative but not limitative purposes according to its preferred embodiments, but it is understood that modifications and/or variations can be introduced from those skilled din the art without departing from the scope as defined in the enclosed claims.

The invention claimed is:

1. A steering control system (1) for a vehicle or a simulator, said vehicle or simulator being provided with directioning means (21', 22', 21", 22"),
   said system (1) comprising
   a direction control device (2), fixed to a support (3) which is coupled to a steering column (4),
   detection means (6) for detecting the position of said direction control device (2), which is installed on said support (3);
   an adjustment module (7, 7', 7") having a frame, mechanically coupled to said direction control device (2), said direction control device (2) being provided with an actuator/adjustment means (8', 8", 8a, 8a', 8b, 8b'), which is capable of adjusting resistance to the movement of said direction control device (2), one or more sensors (27) positioned within the directioning means (21', 22', 21", 22"), for detecting the position of said directioning means (21', 22', 21", 22"), and at least a central control unit (23), which is connected to said one or more sensors (27) capable of calibrating said resistance to the movement of said direction control device (2) by said actuator/adjustment means (8', 8", 8a, 8a', 8b, 8b'), on the basis of a position of said direction control device (2) which is detected by said detection means (6), and is capable of directing said vehicle or simulator by said directioning means (21', 22', 21", 22") and said sensors (27), wherein said adjustment module (7, 7', 7") comprises a first and a second chamber (13a, 13b), positioned in said adjustment module (7,7', 7") where each of said first and second chambers having a volume with an oily fluid, a main worm screw (9) and a lead nut (10) engaged with said main worm screw (9) positioned within said steering column (4), and a hollow piston (11), within which said main worm screw (9) and said lead nut (10) are placed, said hollow piston (11) having a shape that defines said first and second chambers (13a, 13b) which are in communication with each other through a channel (14), so that movement of said main worm screw (9) with respect to said lead nut (10), and vice versa, causes longitudinal translation of said hollow piston (11) that varies the volume in said first and second chambers (13a, 13b), by displacing said oily fluid that is passed through said channel (14) from one of said first or second chambers (13a, 13b) to the other one of said first or second chambers (13b, 13a), said actuator/adjustment means (8', 8", 8a, 8a', 8b, 8b') being suitable for adjusting oily fluid flow passing through said channel (14).

2. The steering control system (1) according to claim 1, further comprising at least one volumetric expansion chamber (41) hydraulically connected with said first and second chambers (13a, 13b), said volumetric expansion chamber (41) being capable of compensating volumetric expansion of said oily fluid at different environment or operational temperatures, so as to obtain a uniform operational pressure.

3. The steering control system (1) according to claim 2, wherein said at least one volumetric expansion chamber (41) for said first and second chambers (13a, 13b) is provided with said hollow piston (42) and retention means (43), provided in such a way that, if a set inner pressure threshold is passed within said first and second chambers (13a, 13b) when the outer temperature rises, said oily fluid flows within said volumetric expansion chamber (41) causing said piston (42) to retract; if the temperature falls, said oily fluid returns from said volumetric expansion chamber (41) to said container (12) by the action of said piston (42) and of said retention means (43).

4. The steering control system (1) according to claim 1, wherein said first chamber (13a) and said second chamber (13b) are positioned inside a main container (12).

5. The steering control system (1) according to claim 1, wherein said main worm screw (9) and said lead nut (10) a sphere recirculation nut or a ground trapezoidal nut.

6. The steering control system (1) according to claim 1, wherein said actuator/adjustment means comprise at least a valve suitable for adjusting the quantity of oily fluid flow passing through said channel (14).

7. The steering control system (1) according to claim 6, wherein:

said at least one valve (8') is of an On/Off type; or in that said at least one valve (8') is of an On/Off bidirectional valve, or in that said at least a proportional valve (8") for adjusting the quantity of oily fluid flow passing through said channel (14); or in that said at least one valve (8") comprises an opening/closure and proportional valve; or it in that said at least one valve (8") comprises a jet valve or manually operated flow rate valve; or in that said at least one valve (8") comprises a first valve which is an opening/closure and proportional valve (8') and a second valve which is an opening/closure (On/Off) valve (8"); or in that said at least one valve (8") comprises a first valve which is a one-way pressure proportional valve (8a) to which a one-way valve (8a') is coupled in parallel wherein between said second chamber (13b) and said channel (14), a second valve is connected which is a one-way pressure proportional valve (8b) to which a one-way valve (8b') is coupled in parallel, that is connected between said first chamber (13b) and said channel (14), and a volumetric expansion chamber (41) that contains a volumetric compensation piston (42), that is slidable within said volumetric expansion chamber (41) and having a buckling spring (43) connected to said volumetric compensation piston (42).

8. The steering control system (1) according to claim 1, wherein said main container (12) comprises valve seats (15, 16) on the surface for installing said at least one valve (8', 8", 8a, 8a', 8b, 8b').

9. The steering control system (1) according to claim 1, wherein said adjustment means comprise at least a jet valve or at least a manual adjustment flow rate valve.

10. The steering control system (1) according to claim 1, wherein said oily fluid is a hydraulic oil or an automatic transmission fluid or silicon based liquid.

11. The steering control system (1) according to claim 1, wherein said main worm screw (9) is fixed to an end of said direction control device (2) or to said steering column (4), and said hollow piston (11) is provided with a seat (11') within which said lead nut (10) is housed, said seat (11') positioning said first and second chambers (13a, 13b) that communicate through said channel (14), so that, following the rotation of said main worm screw (9), that is caused by the movement of said direction control device (2) or said steering column (4), said lead nut (10) moves longitudinally with respect to said main worm screw (9) along with said hollow piston (11)

and said seat (11'), displacing oily fluid passing through said channel (14) from one of said first and second chambers (13a, 13b) to the other one (13b, 13a), varying its volume.

12. The steering control system (1) according to claim 1, wherein said steering column (4) of said control device (2) is fixed to said lead nut (10), and said main worm screw (9) is fixed to said hollow piston (11).

13. The steering control system (1) according to claim 12, wherein said further worm screw is a sphere recirculation worm screw, said further lead nut (46) is a sphere recirculation worm screw and said electric motor (50) is a brushless motor.

14. The steering control system (1) according to claim 12, characterised in that said adjustment module (7') comprises a first return spring (36') and a first washer (37'), and a second return spring (36"), opposed with respect to said first return spring (36'), and a second washer (37"), so that when said steering column (4) is rotated following the rotation of said direction control device (2), said main worm screw (9) translates a modifying volume of said first and second chambers (13a, 13b) by said hollow piston (11) and it alternatively interacts with one of said two washers (37', 37"), according to the translation direction, compressing the corresponding return spring (36', 36") in order to generate a return spring on said steering column (4).

15. The steering control system (1) according to claim 12, wherein said main worm screw (9) has a longitudinal through channel and comprises an inner projection (9') within said longitudinal through channel, and said steering column (4) has an inner housing, wherein
said adjustment module (7") comprises
a further worm screw (45), inserted within said longitudinal through channel of said main worm screw (9),
a further lead nut (46), at least partially inserted within said worm screw (9), and engaged with the same,
an electric motor (50), connected by an elastic coupling (49) with said further worm screw (9) and controlled by said control central unit (23),
so that, when said steering column (4) is rotated following the rotation of said direction control device (2), said electric motor (50) exerts a return torque on the direction control device (2) when operated by said central control unit (23).

16. The steering control system (1) according to claim 15, wherein said further worm screw (45) has a pitch lower than the pitch of said main worm screw (9).

17. The steering control system (1) according to claim 15, wherein said further worm screw (45) has a pitch ratio between 3.3 and 30.

18. The steering control system (1) according to claim 1, characterised in that said central control unit (23) controls said actuating means by modulated electric signals.

19. The steering control system (1) according to claim 1, wherein said central control unit (23) is a programmable unit, for different programs for calibration of resistance that is opposed to movement of said device (2) for controlling the direction that can be selected by the user; said steering control system (1) being provided with interface means (17) comprising means (18, 19, 20) for selecting said programs and a control display (28).

20. The steering control system (1) according to claim 1, wherein said detection means comprise one or more dynamic angular sensors (6).

21. The steering control system (1) according to claim 1, characterised in that said directioning means (21', 22', 21". 22") comprise one or more steering compartment piston—cylinder assemblies (21', 22") and one or more lifting piston—cylinder assemblies (21, 22), respectively for controlling one or more nautical surface transmissions (21, 22) and actuation valves (25a, 25b, 25c and 25d) connected to said central control unit (23), for actuating said steering compartment piston—cylinder assemblies (21', 22') and said lifting piston—cylinder assemblies (21", 22").

22. The steering control system (1) according to claim 21, characterised in that it comprises one or more Hall effect or magneto resistive sensors (27) that are suitable to detect the position of said steering compartment piston—cylinder assemblies (21', 22') and said lifting piston—cylinder assemblies (21", 22").

23. The steering control system according to claim 1 where the direction control device (2), is a steering wheel and where the adjustment module is coupled to said steering column (4).

24. The steering control system (1) according to claim 14, wherein
said main worm screw (9) has a through longitudinal channel and comprises an inner projection (9') within said through channel,
wherein said steering column (4) has an inner housing, and said adjustment module (7') comprises
an adjustment shaft (39), in the intermediate portion of a circular projection (39') and inserted within said through said longitudinal channel of said main worm screw (9),
a first pre-loading ring nut (38'), internally engaged with threads on a first end of said adjustment shaft (39), and
a second pre-loading ring nut (38"), provided within said inner housing of the steering wheel column (4), said second pre-loading ring nut (38") being integrally engaged with threads on a portion close to a second end of said adjustment shaft (39) where said threads are inverse with respect to the threads of said first ring nut (38'),
said first return spring (36') and said first washer (37') being coaxial with respect to said adjustment shaft (39) between said first pre-loading ring nut (38') and said circular projection (39'), said washer (37') being interposed between said first return spring (36') and said circular projection (39'), and
said second return spring (36") and said second washer (37") being coaxial with respect to said adjustment shaft (39) between said second pre-loading ring nut (38") and said circular projection (39'), said second washer (37') being interposed between said second return spring (36") and said circular projection (39'),
so that when said adjustment shaft (39) is rotated, said preloading ring nuts (38', 38") approach or move away each other adjusting compression of said return springs (36', 36") between the same ring nuts and said circular projection (39'), and
when said steering column (4) is rotated following the rotation of said direction control device (2), said main worm screw (9) moves a modifying volume of said first and second chambers (13a, 13b) by moving said hollow piston (11), said main worm screw (9) being adapted to interact on said inner projection (9') with said first washer (37') or with said second washer (37") according to a movement direction, while compressing a corresponding return spring (36', 36") in order to generate a return torque on said steering column (4), while leaving the other washer resting on said circular projection (39').

25. The steering control system (1) according to claim 1, characterised in that it comprises a compensation spring (51) provided between said hollow piston (11) and said frame of said adjustment module (7").

26. The steering control system (1) according to claim 1, wherein said central control unit (23) controls said actuating means by modulated electric signals which are pulse width modulation signals.

27. The steering control system (1) according to claim 1, wherein said main container (12) is a cylinder.

* * * * *